G. E. AND C. A. KRANTZ.
VARIABLE SPEED GEARING.
APPLICATION FILED NOV. 12, 1921.
1,429,439.
Patented Sept. 19, 1922.
2 SHEETS—SHEET 1.
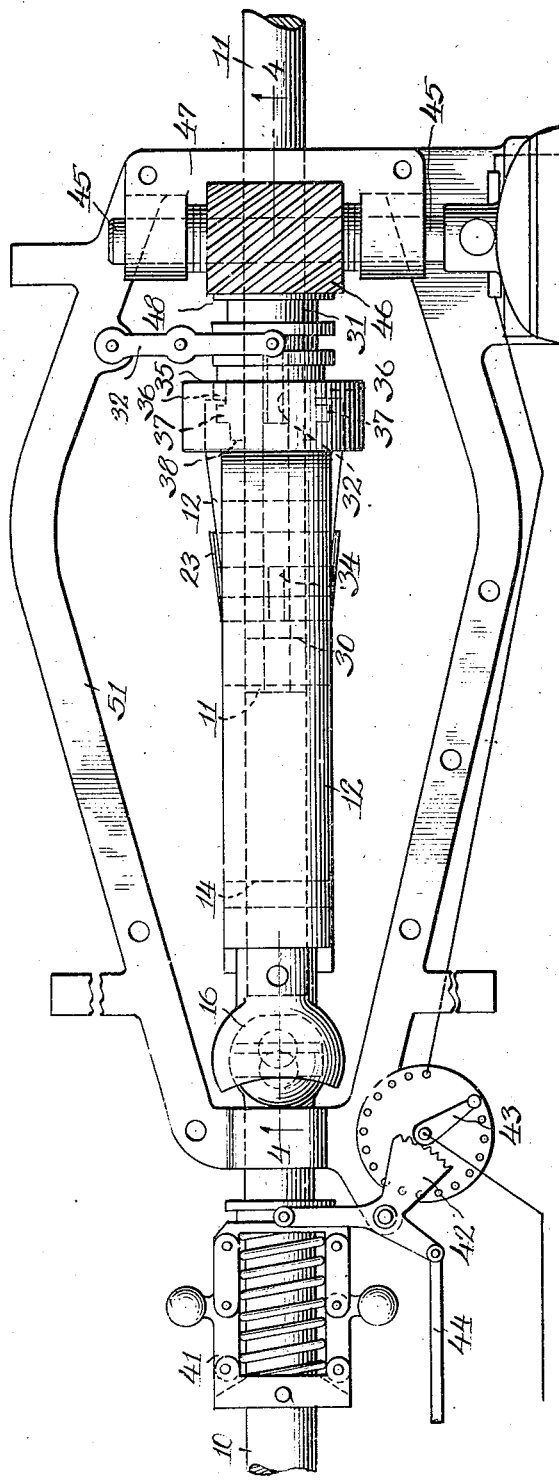
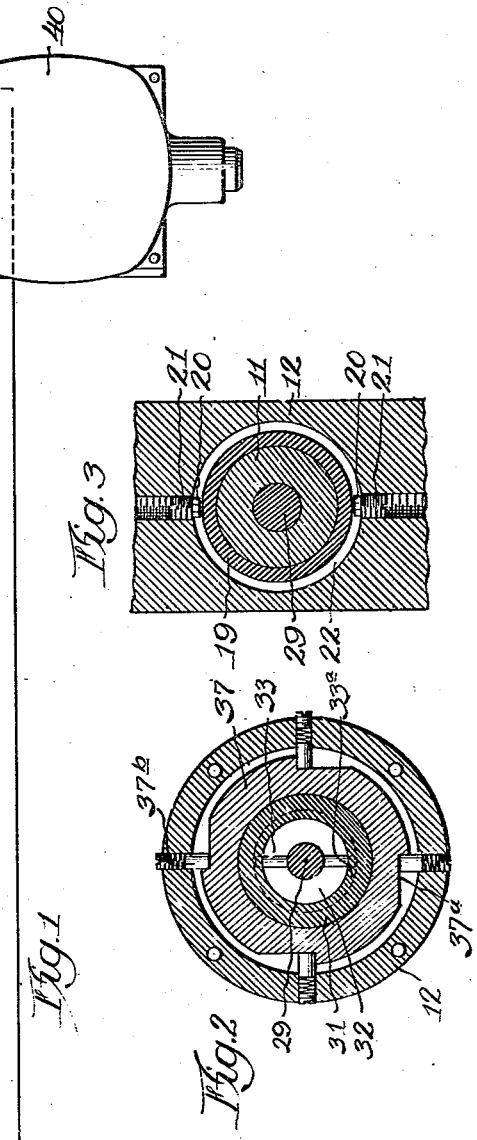
Inventors,
Gust E. Krantz.
Carl A. Krantz.

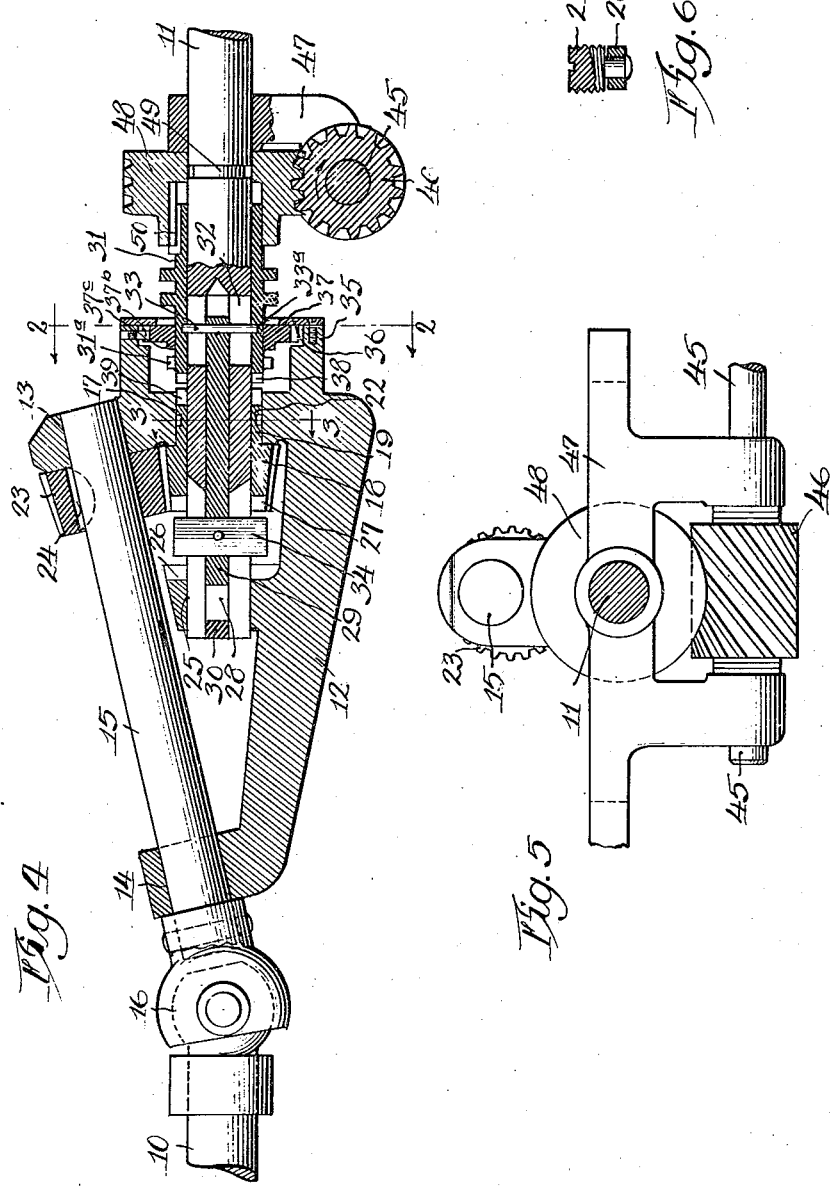

Patented Sept. 19, 1922.

1,429,439

UNITED STATES PATENT OFFICE.

GUST E. KRANTZ AND CARL A. KRANTZ, OF CHICAGO, ILLINOIS.

VARIABLE-SPEED GEARING.

Application filed November 12, 1921. Serial No. 514,532.

*To all whom it may concern:*

Be it known that we, GUST E. KRANTZ, a subject of the King of Sweden, and CARL A. KRANTZ, a citizen of the United States, both residing at Chicago, in the county of Cook and State of Illinois, have invented certain new and useful Improvements in Variable-Speed Gearing, of which the following is a specification.

This invention relates to improvements in variable speed gearing particularly adapted, though not necessarily limited in its use for motor vehicles, and one of the objects of the invention is to provide improved mechanism of this character by means of the use of which shifting of change speed gears will be obviated, the respective co-operating gears always remaining in mesh, and improved means whereby the variable speed may be controlled at will.

A further object is to provide improved positively operated gearing of this character embodying means whereby the variable speed between the driving and driven elements may be electrically controlled.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which—

Figure 1 is a bottom plan view.

Figure 2 is a view taken on line 2—2, Figure 4.

Figure 3 is a sectional view taken on line 3—3, Figure 4.

Figure 4 is a longitudinal sectional view taken on line 4—4, Figure 1.

Figure 5 is a detailed right hand end elevation of Figure 1.

Figure 6 is an enlarged sectional view of a detail.

Referring more particularly to the drawings the numeral 10 designates a driving shaft and 11 designates a driven shaft, the driving shaft receiving its power from any suitable source, and these shafts are preferably arranged in alinement with each other.

Intermediate the driving and driven elements is a floating member 12 which is provided with bearings 13—14 for the reception of an intermediate shaft 15. While in the specification and claims the element 12 will be designated as a floating member or floating support, it is to be understood that such a term is not to be considered as a term of limitation as any suitable support may be provided which is rotatable about the axis of the driven shaft. The axis of the shaft 15 is arranged at an angle to the axes of the shafts 10 and 11 and the shaft 15 is connected with the driving shaft 10 by means of a suitable universal coupling 16. The member 12 is also provided with a bearing 17 in alinement with the shaft 11 and this bearing 17 is of a diameter somewhat larger than the external diameter of the shaft.

A gear 18 is supported by the member 12 and is provided with a hub portion 19 which is journaled in the bearing 17 to rotate freely therein and the gear is held against lateral displacement with respect to the member 12 in any suitable manner preferably by means of rollers 20 carried by plugs 21 removably secured within the member 12 and the rollers 20 are adapted to operate in a groove 22 in the hub 19 of the gear.

This gear 18 together with the hub 19 is provided with an opening therethrough to receive a portion of the shaft 11, and the gear 19 and shaft 11 are adapted for free rotary movement one with relation to the other. The gear 18 meshes with a gear 23 which is secured to the shaft 15 by means of a suitable fastening device 24 in the form of a key so as to rotate therewith.

The inner end of the shaft 11 projects beyond the gear 18 and into a bearing 25 carried by the member 12, the bearing 25 is spaced from the proximate face of the gear 18 and is provided with a clutch face 26, and the adjacent face of the gear 18 is also provided with a clutch face 27, the clutch faces 26 and 27 being spaced from each other for a considerable distance.

The inner end of the shaft 11 adjacent the bearing 25 is provided with a cut out portion 28 in which is arranged a member 29 in the form of a shaft that is adapted to be reciprocated in the opening 28 and the opening 28 is preferably closed by means of a suitable plug or closure 30. The member 29 projects for any desired distance into the shaft 11 and is connected with a sleeve 31, and which sleeve is mounted upon the outer surface of the shaft 11 to be reciprocated thereon by means of a suitable reciprocating lever or arm 32. A portion of the shaft 11 within the sleeve 31 is provided with an elongated slot 32 passing therethrough and into which slot the end of the member 29 projects so that the member 29 may be secured to the sleeve 31 for movement therewith in any suitable manner such as by means of a fastening pin 33 which passes through suitable openings in the sleeve 31 and the end of the member 29. The sleeve is provided with an internal circumferential groove $33^a$ communicating with the slot 32 and in which groove the ends of the pin are adapted to travel when the sleeve 31 and the shaft 11 are rotated one with respect to the other.

Carried by the member 29 intermediate the clutch faces 26—27 is a clutch element 34 which is adapted to be moved into engagement with either of the clutch faces 26—27 when the sleeve 31 is moved in one direction or the other, and is also adapted to be moved into an intermediate or neutral position between the clutch faces 26 and 27, and out of engagement with either one of them.

The member 12 is provided with a housing 35 having a removable cover plate 36 and into which housing the sleeve or collar 31 projects.

Loosely mounted upon the sleeve 31 and within the housing 35 is a ratchet element 37 having ratchet faces $37^a$ with which spring controlled pawls $37^b$ co-operate and for a purpose to be hereinafter set forth. The ratchet element 37 is provided with a clutch face $37^c$ with which a clutch face $31^a$ on the sleeve 31 co-operates. When the clutch faces $37^c$ and $31^a$ are in co-operative relation, the ratchet element will be connected with the sleeve 31 and at the same time the sleeve or collar 31 will be locked to the member 12, so that both the sleeve or collar and the member will rotate together in a manner to be hereinafter set forth. When the clutch face $31^a$ on the sleeve or collar 31 assumes the position shown in Figure 4, the sleeve or collar 31 and the member 12 will be unlocked with respect to each other.

The end of the sleeve or collar 31 is also provided with a clutch face 38 adapted to co-operate with the clutch face 39 carried by the hub 19 of the gear 18 for locking the gear 19 for rotation with the collar 31 when the clutch faces 38—39 are in engagement and for unlocking them when the clutch faces are out of engagement.

The clutch faces $37^c$ and $31^a$, and 38 and 39 are so disposed with respect to each other that when the clutch faces $37^c$ and $31^a$ are in engagement, the clutch faces 38 and 39 will be disengaged, and they are also so disposed with relation to each other that the clutch faces $37^c$ and $31^a$ may be moved out of engagement, and at the same time the clutch faces 38—39 will be disengaged. This latter position is the one that the sleeve or collar 31 will assume when the parts are shifted to a neutral position.

When the sleeve or collar 31 is moved to the right in Figure 4 a sufficient distance to cause the clutch faces $31^a$ and $37^c$ to engage to lock the sleeve or collar with the member 12, through the medium of the ratchet and pawl elements 37 and $37^b$, the clutch member 34 will be moved into co-operative relation with the clutch face 27, thereby locking the gear 18 for rotation with the shaft 11. The motion of the driving shaft 10, will then be imparted to the driven shaft 11, through the medium of the intermediate shaft 15, the gear 23, gear 18, clutch face 27, and clutch element 34 for a forward drive. With the parts in this position the tendency of the floating member 12 is to rotate with the sleeve 31 and in a direction opposite to the direction of rotation of the driven shaft 11. The speed of rotation of the driven shaft 11 under these conditions may be controlled or varied by controlling or varying the speed of rotation of the floating member 12, in a manner to be hereinafter set forth.

When the sleeve or collar 31 is moved to the left in Figure 4 a sufficient distance to cause the clutch member 34 to assume a co-operative position with respect to the clutch face 26 of the bearing 25, the clutch faces 38 and 39 will also be brought into co-operative relation and the gear 18 will be locked to the sleeve 31. The floating member 12 will then be locked to the driven shaft 11, with the result that a reverse motion will be imparted to the shaft 11 through the medium of the shaft 15, gear 23, gear 18, which latter gear 18 is held stationary (in a manner to be set forth) with relation to the floating member 12, which latter is clutched to the driven shaft 11 through the medium of the clutch face 26 and clutch element 34.

It will therefore be seen that the driven element 11 will receive its motion from the driving element 10 through the medium of the shaft 15 and gears 23—18, clutch elements and sleeve 31, the direction of rotation of the driven element 11 being controlled by the position of the sleeve or collar 31 and the respective clutch faces, the shifting of the sleeve or collar 31 being controlled from any suitable point by shifting of the lever 32.

In order to control the speed of rotation of the driven element 11, suitable means may be provided which operate as a resistance to retard the rotation of the driven element 11 and in the present exemplification of this invention such means are herein shown as embodying a variable speed motor 40, which is controlled in any suitable manner either automatically or positively. To that end there may be provided a governor device 41 connected with the shaft 10. This governor device is operatively connected with a toothed pivotally mounted segment 42, which operates upon a shiftable control or cut out device 43 included in the circuit with the motor so that when the speed of rotation of the shaft 10 varies the governor device 41 will automatically operate upon the segment 42 to shift the cut out or control device 43.

If desired the segment 42 may be operated manually through the medium of a rod 44 connected therewith and also connected with a suitable manual device located in a convenient position for the operator. The motor 40 may be located in any convenient position but is preferably disposed adjacent the sleeve or collar 31. To the shaft 45 of the motor is connected a worm 46, the shaft 45 being journaled in a suitable bearing 47. The worm 46 meshes with a worm gear 48 mounted upon the shaft 11 for free rotation with respect thereto and the worm 46 may be held against lateral displacement with respect to the shaft in any suitable manner such as by means of a plug and roller similar to the plug and roller 21—22, which latter is adapted to operate in an annular groove 49 in the shaft 11.

The angles of the teeth of the worm on the motor shaft 25 as well as the angle of the teeth on the worm gear 48 are such that the worm 46 cannot be driven by the worm gear 48 at any time, the sole purpose of the worm 46 co-operating with the gear 48 being to retard the rotation of the gear 48.

The gear 48 has a keyed connection 50 with the sleeve 31 so that the sleeve 31 may be shifted longitudinally of the shaft 11 and with respect to the gear 48, while the sleeve and gear remain keyed together so that the sleeve or collar 31 may be shifted to change the direction of rotation of the driven element 11 while the direction of rotation of the gear 48 remains constant.

By connecting the gear 48 with the sleeve 31 and by retarding the rotation of the gear 48 through the medium of the worm 46 actuated by the variable speed motor 40, it will be seen that such control of the gear 48 will be manifested in the driven element 11.

It is thought that the operation of this device will be clearly understood from the foregoing but briefly stated it is as follows.

The shaft 10 is driven from the source of power and the motor 40 may be operated at any desired speed through the medium of the controlling devices.

When the parts are in the position shown in Figure 4 the driving element 10 and driven element 11 will be disconnected and the gears 23 and 18 will rotate idly inasmuch as they are disconnected with respect to the member 12 and the gear 48 will rotate idly through the medium of the worm 46.

To impart a forward direction of rotation to the driven element 11 the sleeve or collar 31 is shifted to the right in Figure 4 a sufficient distance to cause the clutch faces 37$^c$ and 31$^a$, to lock the sleeve 31 and member 12 together, and at the same time the clutch member 34 will be moved into co-operative relation with the clutch face 27 of the gear 18, thereby locking the gear 18 to the driven shaft 11. In this position of the parts, when the shaft 10 is rotated its rotation will be communicated through the medium of the shaft 15 to the gear 23 and from the gear 23 to the gear 18, and then to the shaft 11, the gear 18 being connected with the driven shaft 11. The floating member 12 will then have a tendency to rotate in a direction opposite to the direction of rotation of the shaft 11. However, this tendency is overcome and the floating member 12 is held against such rotation through the medium of the sleeve 31, worm gear 48, and worm 46, which latter is rotated by the variable speed motor 40. Therefore by varying the speed of the motor, in the manner already set forth, the speed of the shaft 11 may be varied by the variation of the speed of rotation of the worm 46.

When it is desired to reverse the direction of rotation of the shaft 11 the sleeve or collar 31 should be shifted to the left in Figure 4, so as to disconnect the clutch faces 37$^c$ and 31$^a$ to disconnect the sleeve or collar 31 from the member 12 and to move the sleeve or collar to a position that the clutch faces 38 and 39 will be brought into co-operative relation. At the same time the clutch member 34 will be shifted into co-operative relation with the clutch face 26 on the member 12 and the member 12 will then be locked with the driven shaft 11. With the parts in this position, the motion of the shaft 10 will be communicated to the shaft 11, through the shaft 15, gear 23, meshing with the gear 18, but as this gear 18 is held stationary through the medium of the sleeve 31, worm gear 48, and gear 46, the gear 23 will rotate about the gear 18 as a planetary gear. This will cause the floating member 12, which is locked with the shaft 11, to operate as a driving member for the driven shaft 11, thereby imparting to the shaft 11 a direction of rotation reverse to the direction of rotation as set forth in the preceding paragraph.

During the reverse motion of the shaft 11, the worm 46 is held against movement by the motor 40 so that the gear 18 will be held stationary to permit the gear 23 to travel around the axis of the gear 18.

The ratchet and pawl mechanism 37, 37$^b$ is provided as a safety device, the spring controlled pawls 37$^b$ engage the shoulders 37$^a$ so that the ratchet member 37 and member 12 will rotate together under normal conditions, but under abnormal conditions the ratchet member 37 will rotate with respect to the member 12 and thereby prevent an overload on the motor 40.

All of the parts, with the exception of the motor and the controlling mechanism therefor may be enclosed within a suitable casing 51, adapted to be supported in any suitable manner and the casing 51, may if desired, be filled with a lubricating substance.

While the preferred form of the invention has been herein shown and described it is to be understood that various changes may be made in the details of construction and in the combination and arrangement of the several parts, within the scope of the claims, without departing from the spirit of this invention.

What is claimed as new is:—

1. A variable speed gear embodying a driving shaft, a driven shaft, an intermediate shaft connected with one of the first two recited shafts, gearing connecting the intermediate shaft with the other of the said shafts, a floating member supporting the said intermediate shaft and the gear that is connected with the intermediate shaft, means interposed between the said floating member and the driven shaft for operatively connecting the floating member and the driven shaft and for disconnecting them, and means for retarding the rotation of the floating member to control the speed of rotation of the driven shaft.

2. A variable speed gear embodying a driving shaft, a driven shaft, an intermediate shaft connected with one of the first two recited shafts, gearing connecting the intermediate shaft with the other of the said shafts, a floating member supporting the said intermediate shaft and the gear that is connected with the intermediate shaft, means interposed between the said floating member and the driven shaft for operatively connecting the floating member and the driven shaft and for disconnecting them, and means for retarding the rotation of the floating member to control the speed of rotation of the driving shaft, the axis of the said intermediate shaft being inclined to the axes of the driving and driven shafts.

3. A variable speed gear embodying a driving shaft, a driven shaft, an intermediate shaft connected with one of the first two recited shafts, gearing connecting the intermediate shaft with the other of the said shafts, a floating member supporting the said intermediate shaft and the gear that is connected with the intermediate shaft, means interposed between the said floating member and the driven shaft for operatively connecting the floating member and the driven shaft and for disconnecting them, the last recited means embodying mechanism for reversing the direction of rotation of the driven shaft while the direction of rotation of the driving shaft remains constant, and means for retarding the speed of rotation of the driven shaft with respect to the speed of rotation of the driving shaft.

4. A variable speed gear embodying a driving element, a driven element, means operatively connecting the elements and embodying mechanism for disconnecting the elements, means embodying a variable speed motor device for controlling the speed of rotation of the driven element with respect to the speed of rotation of the driving element, and means operating automatically to control the motor.

5. A variable speed gear embodying a driving element, a driven element, means operatively connecting the elements and embodying mechanism for disconnecting the elements, means embodying a variable speed motor device for controlling the speed of rotation of the driven element with respect to the speed of rotation of the driving element, and means responsive in its operation to the operation of the driving element for automatically controlling the motor.

6. A variable speed gear embodying a driving element, a driven element, means operatively connecting the elements and embodying mechanism for disconnecting the elements, means embodying a variable speed motor device for controlling the speed of rotation of the driven element with respect to the speed of rotation of the driving element, means operating automatically to control the motor, and manual means for also controlling the motor at will.

7. A variable speed gear embodying a driving element, a driven element, interposed and directly meshing gears, one of which gears is connected directly with each of the said driving and driven elements, the axes of said gears being maintained in fixed angular relation to each other, and means for electrically controlling the speed of rotation of the driven element with respect to the driving element.

8. A variable speed gear embodying a driving element, a driven element, interposed and directly meshing gears, one of which gears is connected directly with each of the said driving and driven elements, the axes of said gears being maintained in fixed angular relation to each other, means for electrically controlling the speed of rotation of the driven element with respect to the driving element, and means for controlling the said electric means.

9. A variable speed gear embodying a driving element, a driven element, interposed gears operatively connecting the driving and driven elements, the axes of said gears being maintained in fixed angular relation to each other, means for electrically controlling the speed of rotation of the driven element with respect to the driving element, and means operating automatically to control the said electric means.

10. A variable speed gear embodying a driving shaft, a driven shaft, an intermediate shaft operatively connected with one of the first two recited shafts, a floating support for the intermediate shaft, a gear connected with the intermediate shaft, a second gear with which the last recited gear meshes, the last said gears maintaining a fixed relative position, means embodying clutch mechanism for locking the said second gear with the driven shaft and also with the floating support for rotating the driven shaft in one direction, means embodying a portion of the last recited means for locking the said second gear, the last recited means also operating to lock the said floating support with the driven shaft for rotating the driven shaft in the opposite direction, and means for controlling the movement of the floating support.

11. A variable speed gear embodying a driving shaft, a driven shaft, an intermediate shaft operatively connected with one of the first two recited shafts, a floating support for the intermediate shaft, a gear connected with the intermediate shaft, a second gear with which the last recited gear meshes, the axes of the last said gears being maintained in fixed relative angular position, means embodying clutch mechanism for locking the said second gear with the driven shaft and also with the floating support for rotating the driven shaft in one direction, means embodying a portion of the last recited means for locking the said second gear, the last recited means also operating to lock the said floating support with the driven shaft for rotating the driven shaft in the opposite direction, and an electric control for the speed of rotation of the driven shaft with respect to the driving shaft.

12. A variable speed gear embodying a driving shaft, a driven shaft, an intermediate shaft operatively connected with one of the first two recited shafts, a floating support for the intermediate shaft, a gear connected with the intermediate shaft, a second gear with which the last recited gear meshes, the axes of the last said gears being maintained in a fixed relative angular position, means embodying clutch mechanism for locking the said second gear with the driven shaft and also with the floating support for rotating the driven shaft in one direction, means embodying a portion of the last recited means for locking the said second gear, the last recited means also operating to lock the said floating support with the driven shaft for rotating the driven shaft in the opposite direction, the said floating support being rotatable about the axis of the said second gear, and a control for the movement of the floating support.

13. A variable speed gear embodying a driving shaft, a driven shaft, an intermediate shaft operatively connected with one of the first two recited shafts, a floating support for the intermediate shaft, a gear connected with the intermediate shaft, a second gear with which the last recited gear meshes, the axes of the last said gears being maintained in a fixed relative angular position, the axis of the said intermediate shaft and the gear that is connected thereto being inclined to the axes of the driving and driven shafts, means embodying clutch mechanism for locking the said second gear with the driven shaft, a portion of the last recited means operating to lock the floating support for rotating the driven shaft in one direction, means embodying a portion of the last recited means for locking the said second gear and the said floating support with the driven shaft for rotating the driven shaft in the opposite direction, and a variable control for the movement of the floating support.

14. A variable speed gear embodying a driving element, a driven element, a single pair of intermeshing gears intermediate the said elements and adapted to operatively connect them, the axes of said gears being maintained in a fixed inclined position with respect to each other, and means for electrically controlling the speed of rotation of the driven element.

15. A variable speed gear embodying a driving element, a driven element, a single pair of intermeshing gears intermediate the said elements and adapted to operatively connect them, the axes of said gears being maintained in a fixed angular relation, additional gears operatively connected with the driven element, and electrical means for driving one of the last recited gears to control the speed of rotation of the driven element.

16. A variable speed gear embodying a driving element, a driven element, a single pair of intermeshing gears intermediate the said elements and adapted to operatively connect them, the axes of said gears being maintained in a fixed angular relation, an additional gear operatively connected with the driven element for rotation therewith, a separate gear meshing with the said additional gear, and electric means for controlling the speed of rotation of the said additional gear.

17. A variable speed gear embodying a driving element, a driven element, a single pair of intermeshing gears intermediate the said elements and adapted to operatively connect them, the axes of said gears being maintained in a fixed angular relation, an additional gear operatively connected with the driven element for rotation therewith, a separate gear meshing with the said additional gear, and a variable speed motor for rotating the said additional gear.

18. A variable speed gear embodying a driving element, a driven element, a single pair of intermeshing gears intermediate the said elements and adapted to operatively connect them, the axes of said gears being maintained in a fixed angular relation, an additional gear operatively connected with the driven element for rotation therewith, a separate gear meshing with the said additional gear, a variable speed motor for rotating the said separate gear, and means for controlling the said motor.

19. A variable speed gear embodying a driving element, a driven element, means operatively connecting the elements and embodying mechanism for disconnecting the elements, positive means embodying a variable speed motor device for controlling the speed of rotation of the driven element with respect to the speed of rotation of the driving element, means for controlling the motor, and means for reversing the direction of rotation of the driven shaft with respect to the driving shaft.

20. A variable speed gear embodying a driving element, a driven element, intermeshing gears intermediate the said elements and adapted to operatively connect them, the axes of said gears being maintained in a fixed angular relation, an additional gear operatively connected with the driven element for rotation therewith, a separate gear meshing with the said additional gear, electric means for controlling the speed of rotation of the said additional gear, and means for reversing the direction of rotation of the driven shaft with respect to the driving shaft.

21. A variable speed gear embodying a driving element, a driven element, means operatively connecting the elements and embodying mechanism for disconnecting the elements, positive means embodying a variable speed motor device for controlling the speed of rotation of the driven element with respect to the speed of rotation of the driving element, means for controlling the motor, and safety means for preventing overload on the motor.

22. A variable speed gear embodying a driving element, a driven element, means operatively connecting the elements and embodying mechanism for disconnecting the elements, positive means embodying a variable speed motor device for controlling the speed of rotation of the driven element with respect to the speed of rotation of the driving element, means for controlling the motor, and safety means embodying pawl and ratchet mechanism for preventing overload on the motor.

23. A variable speed gear embodying a driving element, a driven element, intermeshing gears intermediate the said elements and adapted to operatively connect them, the axes of said gears being maintained in a fixed angular relation, an additional gear operatively connected with the driven element for rotation therewith, a separate gear meshing with the said additional gear, electric means for controlling the speed of rotation of the said additional gear, and safety means intermediate the first recited gears and the said additional gear for preventing overload on the motor.

24. A variable speed gear embodying a driving element, a driven element, intermeshing gears intermediate the said elements and adapted to operatively connect them, said gears being maintained in a fixed relation to each other, an additional gear operatively connected with the driven element for rotation therewith, a separate gear meshing with the said additional gear, electric means for controlling the speed of rotation of the said additional gear, and automaticaly operating safety means for preventing overload on the motor.

25. A variable speed gear embodying a driving element, a driven element, intermeshing gears intermediate the said elements and adapted to operatively connect them, the axes of said gears being maintained in a fixed angular relation, an additional gear operatively connected with the driven element for rotation therewith, a separate gear meshing with the said additional gear, electric means for controlling the speed of rotation of the said additional gear, and means operating automatically to cause the said additional gear to yield with respect to its connected parts under predetermined conditions to prevent overload on the motor.

26. A variable speed gear embodying a driving shaft, a driven shaft, an intermediate shaft, means operatively connecting the intermediate shaft with one of the two recited shafts, means embodying two gears only for connecting the intermediate shaft with the other of the said shafts, a floating member supporting the intermediate shaft and the gear that is connected with the intermediate shaft, means interposed between the driven shaft and the floating member for operatively connecting the floating member and the driven shaft and for disconnecting them, and means for retarding the rotation of the floating member to control the speed of rotation of the driven shaft.

27. A variable speed gear embodying a driving shaft, a driven shaft, an intermediate shaft, means operatively connecting the intermediate shaft with one of the two recited shafts, means embodying two gears only for connecting the intermediate ate shaft with the other of the said shafts, a floating member supporting the intermediate shaft and the gear that is connected with the intermediate shaft, means interposed between the driven shaft and the floating member for operatively connecting the floating member and the driven shaft and for disconnecting them, means for retarding the rotation of the floating member to control the speed of rotation of the driven shaft in one direction, and means for reversing the direction of rotation of the driven shaft, the last recited means embodying means for locking one of the said gears and means for locking the floating member with the driven shaft.

28. A variable speed gear embodying a driving shaft, a driven shaft, an intermediate shaft operatively connected with the first two recited shafts, a floating support for the intermediate shaft, said support being rotatable about the axis of the driven shaft, a gear connected with the intermediate shaft, a second gear with which the last recited gear meshes, the last said gears maintaining a fixed relative position, and means embodying clutch mechanism for locking the said second gear with the driven shaft and also with the floating support for rotating the driven shaft in one direction, means embodying a portion of the last recited means for locking the said second gear, the last recited means also operating to lock the said support with the driven shaft for rotating the driven shaft in the opposite direction, and means for controlling the movement of the floating support.

29. A variable speed gear embodying a driving element, a driven element, one pair of intermeshing gears, one of which gears is operatively connected with each of the said driving and driven elements, means whereby the speed of rotation of the driven element may be varied with respect to the speed of the driving element and while the said gears remain in mesh and in a fixed position with relation to each other, and means whereby the direction of rotation of the driven element may be reversed while the direction of rotation of the driving element remains constant and while the said gears are in mesh.

In testimony whereof we have signed our names to this specification, on this 5th day of November, A. D. 1921.

GUST E. KRANTZ.
CARL A. KRANTZ.